United States Patent [19]

Cogliano et al.

[11] Patent Number: 5,039,556

[45] Date of Patent: Aug. 13, 1991

[54] TREATING CONCRETE STRUCTURES TO INHIBIT CORROSION BY HEATING THE STRUCTURE, COOLING SAME UNDER CONTROLLED TEMPERATURE GRADIENT, AND APPLYING AN INHIBITING AGENT TO AN INTERNAL PORTION OF THE STRUCTURE

[75] Inventors: Joseph A. Cogliano, Pasadena; Arnold M. Rosenberg, Potomac, both of Md.

[73] Assignee: W. R. Grace & Co.-Conn., New York, N.Y.

[21] Appl. No.: 621,196

[22] Filed: Dec. 3, 1990

[51] Int. Cl.$^5$ ............................................. B05C 1/16
[52] U.S. Cl. .................................. 427/136; 427/314; 427/353; 404/75; 404/77
[58] Field of Search ................ 427/136, 324, 353; 404/75, 77

[56]  References Cited

U.S. PATENT DOCUMENTS

| 4,109,033 | 8/1978 | Blankenhorn et al. | 427/314 |
| 4,153,473 | 5/1979 | Rosenberg et al. | 134/5 |
| 4,285,733 | 8/1981 | Rosenberg et al. | 106/98 |

OTHER PUBLICATIONS

National Cooperative Highway Research Program Report 257-Long-Term Rehabilitation of Salt-Contaminated Bridge Decks, Transportation Research Board, National Research Council, Washington, D.C.

Primary Examiner—Shrive Beck
Assistant Examiner—Benjamin L. Utech
Attorney, Agent, or Firm—Howard J. Troffkin

[57] ABSTRACT

A method of posttreating a concrete structure to provide corrosion inhibiting properties by heating the structure to remove entrapped water, cooling the structure under a maximum temperature gradient of +2° C./in. thickness, applying an aqueous solution of corrosion inhibitor and then an aqueous wash.

13 Claims, No Drawings

TREATING CONCRETE STRUCTURES TO INHIBIT CORROSION BY HEATING THE STRUCTURE, COOLING SAME UNDER CONTROLLED TEMPERATURE GRADIENT, AND APPLYING AN INHIBITING AGENT TO AN INTERNAL PORTION OF THE STRUCTURE

BACKGROUND OF THE INVENTION

The present invention is directed to a method of rehabilitating and stabilizing salt contaminated concrete structures.

It is well known that reinforced concrete structures, such as bridges, parking garages, and the like are highly susceptible to corrosion and degradation from commonly applied chloride deicing salts. It is believed that a large percentage of all bridge decks in the United States and in other countries which have cold climates are seriously deteriorated because of corrosion of the reinforcing steel which is part of their structure. This corrosion is usually caused by chloride ions that have penetrated the concrete as a result of repeated application of deicing salts. In the case of concrete parking structures, automobiles carry salt contaminated ice and snow to the structure and, while parked, allow the contaminated ice and snow to melt and concentrate on concrete structure. In all cases accumulation of corrosion products around the reinforcing steel causes cracks to develop in the concrete cover. This allows even more rapid intrusion of additional chloride solution and, thereby, accelerates corrosion and spalling of the concrete structure. If corrosion and spalling is allowed to continue, the metal reinforcements, as well as the surrounding concrete, deteriorate to a point which requires substantial removal and replacement of the entire structure. This is a difficult and costly endeavor.

Several methods have been suggested to ameliorate the condition of concrete structures which have undergone or are susceptible to corrosion deterioration. For example, low permeability overlays have been applied to deteriorated structures. In such instances, spot repairs of severely deteriorated concrete is first accomplished. However, large areas of chloride-contaminated concrete remain in place and, although slowed, corrosion and deterioration continue to occur. Thus, this method alone does not address the need for a long-term rehabilitation procedure.

A rehabilitation technique which is often used involves scarifying the top portion of a bridge deck or the like prior to application of a new overlay. Scarification to a level within 0.5 inch of the embedded reinforcement metal elements removes a major amount of contaminated concrete, permits impregnation of corrosion inhibiting agents to the concrete around the steel reinforcements and then application of a new overlay concrete structure. A preferred mode requires removal of the concrete surrounding the steel reinforcements prior to applying a new overlay. These methods are not cost-effective and are, therefore, only viewed as a secondary means to the complete removal and replacement of the concrete structure.

In an attempt to offer a more cost effective method to nullify the effects of chlorides and other corrosion elements to concrete structures and to cause the resultant structure to exhibit long-term effectiveness, impregnation of salt-contaminated, but structurally sound structures, with corrosion resisting materials has been proposed. Impregnation to a depth sufficient to encapsulate the reinforcement was thought to provide the long term protection. Impregnation with polymers such as methyl methacrylate, or water tolerant monomers and/or corrosion inhibitors, have been attempted but have been found to be costly, difficult to apply and have detrimental effects with respect to the resultant concrete properties.

Prior impregnation techniques have been found difficult to carry out in an effective manner. It is well known that concrete is a porous structure. The pores contain residual water from that used during hydration of the cement as well as rain water and the like which has penetrated into the pores over a period of time. Thus, impregnation of organics or even aqueous solutions into such already occupied pores has been found to be extremely difficult. It has been previously proposed that impregnation be carried out by first heating the concrete structure to drive-off the water contained in the pores followed by application of the impregnating solution. However, when this method has been previously used the resultant structure showed extensive cracking which not only weakened the structure but also made it more susceptible to attack by subsequently applied chloride salts.

There is the need for a process which can provide a feasible and effective means of arresting corrosion of reinforcement in sound but corrosive salt-contaminated concrete without causing detrimental effects to the other desired concrete properties such as strength, permeability freeze/thaw properties and structural soundness. Further, there is a need to provide a process of posttreating a sound concrete structure to insure its ability to withstand the corrosive forces of subsequently applied corrosive causing agents, such as chloride salts.

SUMMARY OF THE INVENTION

The present invention provides a process of posttreating concrete structures to substantially arrest corrosion of the metal reinforcing elements contained therein without detrimentally effecting the concrete structure. Specifically, the present invention is directed to a post-treatment (with respect to the formation of the concrete structure) process of heating a concrete structure to an elevated temperature of at least about 100° C., cooling the structure under controlled conditions to maintain a temperature differential between the structure's upper surface and a predetermined depth of 2° C./inch or less of concrete thickness, and then impregnating the concrete with an aqueous solution of a corrosion controlling agent. The resultant structure is capable of withstanding corrosive attack over a sustained period of time and does not cause deleterious effects to its structural integrity.

DETAILED DESCRIPTION

The present invention is directed to posttreatment of sound concrete formations to inhibit future corrosion of the metal reinforcement therein and deterioration of the surrounding concrete. The corrosive element normally causing the problem to reinforced concrete formations are chloride ions which interact with the metal of the reinforcement and cause its deterioration. The chloride ions may be supplied by conventional application of deicing salts, such as alkali or alkaline earth metal chlorides. The chloride ions may also be supplied by environmental means especially when the concrete structure is located near salt-water bodies. In addition, corrosive salt may be supplied by secondary means, such as by vehicles which have salt-laden ice or snow thereon which, when parked, melts and is redeposited on the concrete structure (such as parking garages and the like).

In all cases, the process of the present invention is directed to enhancing structurally sound concrete formations. That is, formations which have not had sufficient deterioration to make them susceptible to normal usage. The concrete formation may be only recently formed or may be laden with chloride or other corrosive salt provided that corrosion of the reinforcements has not advanced to the point of unsafe condition.

Concrete formations most appropriate for application of the present process are bridge decks and parking garage structures formed from reinforced concrete. Depending on the size of the structure and the equipment, the present process can be applied to the entire structure or to sections of the structure in a continuous or discontinuous manner.

The process involves initially heating the structure to be treated. A temperature of at least about 100° C., (preferably from about 100° C. to about 110° C.) at a predetermined depth (thickness) of the concrete structure is normally sufficient although somewhat lower or higher temperatures may be satisfactory. It is not necessary to protect (and thereby treat) the entire structure's thickness. Normally, treatment to a depth where the reinforcement metal (e.g. rebars) is located or a depth of about half of the thickness is sufficient in most instances. The temperature of the structure (both for heating and for cooling, as described below), can be readily monitored by placement of at least one thermocouple or the like temperature measuring means on the upper surface, the lower surface and at the predetermined depth of the concrete structure to which protection is desired. It is understood that as the structure reaches the temperature of 100° C. or greater at the predetermined depth, the upper surface (to which heat is being applied) will be at a higher temperature while the lower surface will be at a lower temperature.

Prior to initiating actual heating, the structure should be treated to provide an efficient and effective process. The structure, as discussed above, should have temperature monitoring means, such as thermocouples, applied to the upper surface and into the structure to the predetermined depth (e.g. to the level of the rebars or the middle of the structures thickness or the like). Optionally temperature monitoring means can also be applied to the underside surface of the structure.

Further, in order to efficiently and effectively heat the concrete structure, an overstructure should be constructed to concentrate the heat onto the defined surface. Normally sections of a structure are treated due to the large area of an entire structure, such as a bridge deck or parking garage. The overstructure need not be elaborate but merely provides a means of concentrating the heat and not allowing it to merely dissipate to the surrounding environs. A metal tube and fiberglass insulating panel overstructure will provide the needed heat concentration. The super structure should have means which allow air to escape and thus carry out the moisture laden air developed within the environ of the overstructure. This can be readily done by having the side panels of the insulating superstructure extend to a point above the upper surface of the concrete structure. The overstructure may also be made mobile so that it can be readily moved from section to section of the concrete structure being treated.

Still further, the periphery of the treated structural area should be insulated. Exposed edges should be insulated with glass batting or the like. Areas of the concrete structure which are adjacent to the area being treated should have their surfaces insulated. The insulated surface may extend at least about two feet from the treated structure but the exact amount is not critical provided it permits a gradual gradient of temperature between the treated and adjacent untreated portion. Optionally, insulation may be also applied to the underside of the treated and adjacent areas of the structure.

Prior to treatment, the area to be treated may be scored to increase the surface area and thereby provide greater heating ability as well as greater ability to absorb the subsequently applied corrosion control solution, as more fully described below. The scoring of the surface is especially useful when treating structures which have an upper surface which is substantially not horizontal. In such instances, the scoring should be perpendicular to the slope of the upper surface.

With the canopy or superstructure over the concrete structure to be treated and the insulation in place, as described above, the structure is heated with the aid of any conventional high capacity heat source. The specific capacity will depend upon the size of structure being treated at any one time. Conventional units having capacities of up to 600,000 BTUH and greater are available. Such sources of heat include, for example, portable oil fired heaters or gas heaters. In certain instances, the heaters may be modified to adjust the volume of air entering the unit and thereby increase the temperature rise capacity of a given unit.

The concrete structure is heated in a gradual manner. The rate of heating is not critical. Heating at rates of up to about 20 BTU per hour-sq.ft.-degree F. (preferably from about 2-20 BTU per hr.-sq.ft.-deg.F.) is satisfactory. Heating is normally done in a continuous manner until the desired concrete temperature is reached. At this point in time, the upper surface is
at the highest temperature, (normally about 110°-140° C.), while the bottom surface is at the lowest temperature of the slab (normally from slightly above ambient when not insulated to about 60°-100° C. when insulated). The internal temperature of the concrete structure at the predetermined thickness depth between upper and lower surfaces should be at about 100° C., as stated above.

Once the structure has reached the desired temperature at the predetermined thickness or depth, heating is stopped and cooling of the structure is allowed to commence under controlled conditions. It has been unexpectedly found that the cooling profile of the upper portion of the concrete structure has been found to be critical in providing a structure having ultimate beneficial effects. The upper portion is meant herein and in the appended claims to be the structure's thickness above the predetermined depth.

When the heat source is stopped, the temperature profile of the upper surface rapidly decreases with time giving up heat both to the adjacent atmosphere above the surface and to the concrete mass below. The temperature profile at the predetermined depth and at the lower surface normally continues to rise for a short period of time and then commence cooling. The temperature gradient throughout the thickness of the concrete structure being treated from the upper surface to at least the predetermined thickness must not be greater than 2° C./inch thickness. That is, the internal temperature should not be allowed to exceed 2° C./inch gradient with respect to the upper surface (which, after an initial period, will be cooler than the internal temperature). Thus, initially there is a negative gradient as the upper surface is hotter than that of the predetermined depth. Within a short period the upper surface temperature falls below the predetermined depth temperature. The upper surface must not be allowed to cool at a rate which would allow it and the intervening concrete thickness to surpass the 2° C./inch temperature differential. The peripheral insulation material and the insulating superstructure initially applied not only helps in heating the structure more efficiently but also aids in controlling the cooling within the required limits and not to permit large temperature differentials between the structure and the surrounding atmosphere. Further, the heater can be intermittently used to maintain the air above the structure at a suitable temperature to also aid in controlling the cooling within the required limits.

It is further preferred that the temperature gradient between the internal predetermined level and the lower exposed surface of the concrete structure be maintained at less than about 15° C./inch of thickness although it has been found that this lower thickness gradient is not critical and may be varied to a greater or lesser degree without causing adverse effects on the resultant structure.

The structure should be allowed to cool to within about 20° C. of ambient temperature, preferably within 10° C. of ambient and most preferably ambient temperature. After the structure has substantially cooled, a solution of a suitable concrete structure corrosion inhibiting agent should be applied to the upper surface. The inhibiting agent can be selected from commonly known compounds and compositions which are known to counteract and/or inhibit corrosion of reinforced concrete structures by chloride. Examples of such agents include alkali and alkaline earth metal nitrites and, preferably, calcium nitrite. The corrosion inhibiting agent should be applied as aqueous solution having the agent in concentration of from about 5 up to about 20 wt. percent, preferably from about 10 up to about 15 wt. percent are normally satisfactory. Very high concentrations (greater than 25 wt. percent) should be avoided. The corrosion inhibiting agent should be applied in amounts to provide an effective dosage to counter the chloride corrosion agent already present and to provide a residual amount to inhibit future corrosion. The particular dosage will, therefore, depend on the concrete structure being treated and can be readily determined by the field engineer. Normally, dosages of from about 0.5% s/s (agent solids/cement solids) to 5% s/s and preferably from about 1% s/s to 3% s/s provide satisfactory long term inhibiting properties to concrete structures.

The corrosion inhibiting agent containing aqueous solution is readily applied to substantially horizontal surfaces by damming the periphery of the upper surface and ponding the solution on the surface. Sloped surfaces can be treated by spraying the surface or, as discussed above by applying the solution to grooved surface such that the solution is trapped in the grooves. The solution is applied over a period of time (usually 4-24 hours) until the rate of absorption of the solution into the prior dried concrete is minimal. Solutions having concentrations of about 10-15 wt. percent inhibiting agent provide most effective dosage application in a reasonable period (normally 4-24 hrs). The entire surface should be kept wet with the application solution for a time until the rate of its absorption into the concrete is minimal. When the upper surface had not cooled to ambient temperature, the solution should be at a temperature of about i.e. ±10° C. (preferably ±2° C.) of the upper surface temperature of the structure.

Following application of the corrosion inhibiting solution, as described above, water should be applied to the concrete upper surface to force the corrosion inhibiting solution further into the structure's thickness and away from the structure's upper surface region. If the inhibiting agent is allowed to remain in concentrated form at the upper surface and the thickness immediately adjacent thereto ("the upper surface region"), the concrete may exhibit poor freeze-thaw properties which will result in spalling of the concrete. The amount of flush water used will vary with the particulars of the structure as, for example, its porosity, the amount of corrosion inhibitor applied, the depth of the rebars and the like. Flush water in the amount of from about 0.1 to 10 times the amount of corrosion inhibiting agent containing solution is normally satisfactory.

The above steps provide a means of enhancing the corrosion inhibiting characteristics of a reinforced concrete structure without causing reduced physical and structural characteristics of the resultant structure, as are commonly observed with respect to presently treated structures. In addition to the above, one may subsequently apply a low permeability overlay to the concrete structure to further reduce the rate at which any corrosive chloride or other agent can impregnate the structure. Such low permeability overlays are well known and include application of polymer concrete overlay, low-permeability concrete composition overlay or application of a membrane/concrete overlay to the existing and now treated structure.

The present process provides a means for readily impregnating a reinforced concrete structure with a corrosion inhibiting agent, for arresting the corrosive effect of the chloride already contained in the concrete structure, for inhibiting future corrosion by subsequently applied corrosive agents (like deicing chloride salts) and to provide a sound reinforced concrete structure for an extended period of time. The present process unexpectedly provides the above benefits without causing detrimental effects to the resultant structure (such as cracking, spalling, poor freeze-thaw performance and the like).

The following is given as an illustrative example of the subject process. It is not meant to be a limitation on the invention as defined by the appended claims. All parts and percentages are by weight unless otherwise stated.

EXPERIMENTAL TESTING

An existing bridge specimen which was tested consisted of a three year old typical slab and girder bridge type construction used in highways in the United States. The bridge specimen used for this study was a full-scale composite steel girder-reinforced concrete deck highway bridge simply supported on a 48 ft span. The overall dimensions of the bridge specimen were 48 ft long by 20.5 ft. wide carried by three W36×150 steel girders located at the center and 3.5 from each edge. Two types of bridge deck construction schemes were used along the length of the bridge. On the northern half of the bridge, the deck consisted of 7½/2-in.-thick cast-in-place slab with two courses of #4 reinforcing bars at 8.75 inches cc in both directions in the center portion and 4.75 inches cc in both directions at the portions extending outside the girders to the edge. A 2 inch clear concrete cover was over the upper rebars. The design strength of the concrete was 4000 psi. The southern half of the bridge consisted of six precast, transversely prestressed panels, 4 in. thick, spanning between girders (6000 psi concrete) upon which is layed a 3½ in. topping of 4000 psi concrete having a single course of No. 4 reinforcing bars at 8.75 inches cc in both directions. The overhangs were cast-in-place 4000 psi concrete. The precast, prestressed panels were made using 6000 psi concrete.

The data collected during testing consisted of temperature readings and deflection measurements. Temperature was measured using thermocouples connected to a digital readout device. Temperature values were recorded for the hot air heating the bridge deck, the ambient temperature and the temperature at various locations in the bridge deck.

Using the cast-in-place concrete slab section (northern half) of the bridge as the test specimen, thermocouples were placed middistance between the exterior and interior girders at top surface/mid depth/and bottom surface.

The bridge deck was observed for cracks and other deteriorations prior to treatment. All cracks were marked. The test portion was covered by a hood consisting of a light steel frame covered by insulated panels which was easily assembled at the test site. Approximately, a 0.5 inch gap was provided all around the heated area between the hood and the like concrete surface in order to allow the hot air to escape thus preventing excessive build up inside the hood. The hood was also equipped with a portable oil-fired forced fan heater having a 600,000 BTUH capacity. The extended edges of the bridge were wrapped with insulation.

The heating was commenced using a hot air temperature profile of 5 BTU/hr.-sq.ft.-deg. F. and was continued for about 13 hours and then shut off. The temperature profile during heating was measured and given in three hour intervals in Table I below.

TABLE I

| | Heating | | | |
| | | Time | | |
| Location | 3 hr | 6 hr | 9 hr | 12 hr |
| --- | --- | --- | --- | --- |
| Hood Air | 194° C. | 221° C. | 238° C. | 243° C. |
| Top Surface | 127° C. | 149° C. | 155° C. | 155° C. |
| Mid-Depth | 49° C. | 77° C. | 94° C. | 105° C. |
| Bottom Surface | 38° C. | 54° C. | 71° C. | 88° C. |
| Ambient | 35° C. | 32° C. | 29° C. | 32° C. |

The mid-depth and bottom surface continued to rise for approximately 1.5 hours after heating stopped to a maximum temperature of 110° C. and 94° C., respectively. The upper surface and hood air temperatures quickly dropped and were monitored to have the upper surface to mid-depth temperature be maintained at a maximum differential of 6° C. or less than 2° C./inch thickness. After 41 hours the hood was completely removed and the slab was examined for cracks. Only a few minute cracks of the order of 0.005 in. wide or less were observed and then only between already existing cracks. These cracks became almost undetectable upon complete cooling. In any case the observed cracks were not of a structural nature and would have no effect on the structural performance and serviceability of the bridge structure.

Impregnation of the dried concrete slab with a 15 percent solution of calcium nitrite was conducted by covering the surface with approximately 1 to 1½ in. of the solution for approximately twenty four hours. At that time, the excess solution was removed and the concrete surface ponded with water for three days and then removing the water. Upon completion of the posttreatment procedure, cores were taken at different locations on the treated area and on the untreated area for strength testing. Testing of the cores in compression did not reveal any damage to the integrity, strength and load carrying capacity of the concrete as a result of the posttreatment procedure. The strength of the concrete in both the treated and untreated areas of the slab as indicated by the core tests was in range from 4600 to 5000 psi.

What is claimed:

1. A process of inhibiting corrosion of a concrete structure having an upper surface, a lower surface, a thickness composed of a concrete composition therebetween which has reinforcement metal embedded therein, comprising
    a) heating at least a portion of said concrete structure to at least about 100° C. at a predetermined depth of said structure's thickness;
    b) cooling said concrete structure at a rate to maintain a temperature gradient from said upper surface to said predetermined depth of up to +2° C. per inch;
    c) applying an aqueous solution of a corrosion inhibiting agent to said upper surface of said structure for a sufficient time to provide a corrosion inhibiting amount of said agent to said structure; and
    d) apply an aqueous wash to said upper surface of said structure to remove said agent from said upper surface region of said structure.

2. The process of claim 1 wherein said temperature gradient during step (b) is initially a negative gradient (upper surface hotter than predetermined depth) and subsequently a positive gradient, and said cooling is continued at least until said upper surface reaches ambient temperature.

3. The process of claim 1 wherein said structure's exposed surfaces adjacent to the treated portion are insulated.

4. The process of claim 1 wherein said predetermined depth is directly above the level of the reinforcement metal.

5. The process of claim 1 wherein said predetermined depth is from about 0.25 to about 0.5 of the structures total thickness from the upper surface.

6. The process of claim 1 wherein said corrosion inhibiting agent comprises calcium nitrite.

7. The process of claim 6 wherein said dosage of calcium nitrite applied to the structure is from about 0.5% s/s to about 5% s/s.

8. The process of claim 1, 2, 3, 4, 5, 6 or 7 wherein said corrosion inhibiting solution is an aqueous solution containing from 5 to 20 wt. percent calcium nitrite therein.

9. The process of claim 1 wherein said structure is heated at a rate of up to about 20 BTU/hr.-sq.ft.-deg.F.; the exposed peripheral surfaces surrounding the treated structure are insulated; said corrosion inhibiting agent solution's temperature is substantially equal to the upper surface temperature; and said aqueous wash is applied to said upper surface.

10. The process of claim 8 wherein said corrosion inhibiting solution is an aqueous solution containing from about 5 to 20 wt. percent calcium nitrite therein.

11. The process of claim 9 wherein said dosage of calcium nitrite applied to said structure is from about 0.5% s/s to about 5% s/s.

12. The process of claim 1 wherein said aqueous wash is applied and causes said corrosion inhibiting agent to move to the interior thickness of said structure.

13. The process of claim 9 wherein said aqueous wash is applied and causes said corrosion inhibiting agent to move to the interior thickness of said structure.

* * * * *